(12) United States Patent
Hamilton et al.

(10) Patent No.: US 9,184,800 B2
(45) Date of Patent: Nov. 10, 2015

(54) AUTOMATED SHARING OF APPLICATION DATA OVER A NEAR FIELD COMMUNICATION LINK

(71) Applicant: Google Inc., Mountain View, CA (US)

(72) Inventors: Robert William Hamilton, Santa Clara, CA (US); Martijn Franciscus Agnes Coenen, Santa Clara, CA (US); Rachel Leah Garb, Mountain View, CA (US); Jeffrey William Hamilton, Austin, TX (US); Nicholas Julian Pelly, San Francisco, CA (US)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 13/905,210

(22) Filed: May 30, 2013

(65) Prior Publication Data

US 2014/0017996 A1     Jan. 16, 2014

Related U.S. Application Data

(60) Provisional application No. 61/671,965, filed on Jul. 16, 2012.

(51) Int. Cl.
*H04B 5/00* (2006.01)
*H04W 4/00* (2009.01)
(Continued)

(52) U.S. Cl.
CPC ............... *H04B 5/0031* (2013.01); *G06F 9/48* (2013.01); *G06F 9/54* (2013.01); *H04W 4/008* (2013.01)

(58) Field of Classification Search
CPC ........................... H04B 5/0062; H04B 5/0056
USPC ................................ 455/41.1, 41.2, 41.3, 517
See application file for complete search history.

(56) References Cited

U.S. PATENT DOCUMENTS

| 5,301,309 A | 4/1994 | Sugano |
| 5,819,021 A | 10/1998 | Stanfill et al. |

(Continued)

FOREIGN PATENT DOCUMENTS

| EP | 1760584 A | 3/2007 |
| EP | 2432277 A1 | 3/2012 |

(Continued)

OTHER PUBLICATIONS

International Search Report and Written Opinion for International Application No. PCT/US2014/025482 mailed Aug. 5, 2014 (11 pages).

(Continued)

*Primary Examiner* — Sonny Trinh
(74) *Attorney, Agent, or Firm* — Remarck Law Group PLC

(57) ABSTRACT

A computer-implemented technique includes establishing, at a first computing device including one or more processors, a near field communication (NFC) link with a second computing device. The technique includes identifying, at the first computing device, an application having a foreground designation in an operating system of the first computing device, the identifying being performed upon establishment of the NFC link with the second computing device. The technique includes determining, at the first computing device, an identifier for the application, wherein the identifier uniquely identifies the application at a source external to the first computing device. The technique also includes transmitting, from the first computing device, the identifier for the application via the NFC link to the second computing device.

20 Claims, 6 Drawing Sheets

(51) Int. Cl.
    *G06F 9/54* (2006.01)
    *G06F 9/48* (2006.01)

(56) References Cited

U.S. PATENT DOCUMENTS

| | | | |
|---|---|---|---|
| 6,462,767 | B1 | 10/2002 | Obata et al. |
| 6,634,025 | B1 | 10/2003 | Hauptmann et al. |
| 7,089,007 | B2 | 8/2006 | Wakuta et al. |
| 7,516,891 | B2 | 4/2009 | Chaum |
| 7,529,653 | B2 | 5/2009 | Frankel et al. |
| 7,775,432 | B2 | 8/2010 | Jalkanen et al. |
| 7,821,399 | B2 | 10/2010 | Otranen |
| 7,957,518 | B2 | 6/2011 | Erb |
| 7,957,733 | B2 | 6/2011 | Wang et al. |
| 7,962,142 | B2 | 6/2011 | O'Neill et al. |
| 7,970,350 | B2 | 6/2011 | Sheynman et al. |
| 7,995,533 | B1 | 8/2011 | Koodli et al. |
| 8,056,113 | B2 | 11/2011 | Balasubramanian et al. |
| 8,060,389 | B2 | 11/2011 | Johnson |
| 8,060,560 | B2 | 11/2011 | Vonog et al. |
| 8,112,066 | B2 | 2/2012 | Ayed |
| 8,126,395 | B2 | 2/2012 | Tasala et al. |
| 8,171,137 | B1* | 5/2012 | Parks et al. ............. 709/224 |
| 8,214,686 | B2 | 7/2012 | Ueda |
| 8,224,894 | B1 | 7/2012 | Parks et al. |
| 8,308,065 | B2 | 11/2012 | Jalkanen et al. |
| 8,358,596 | B2* | 1/2013 | Byrne et al. ............. 370/255 |
| 8,366,000 | B2 | 2/2013 | Jalkanen et al. |
| 8,478,816 | B2 | 7/2013 | Parks et al. |
| 2002/0033981 | A1 | 3/2002 | Keller et al. |
| 2003/0220937 | A1 | 11/2003 | Maeoka et al. |
| 2004/0055004 | A1 | 3/2004 | Sun et al. |
| 2005/0058112 | A1 | 3/2005 | Lahey et al. |
| 2005/0235029 | A1 | 10/2005 | Hussman |
| 2006/0094356 | A1 | 5/2006 | Dawidowsky |
| 2006/0179079 | A1 | 8/2006 | Kolehmainen |
| 2006/0294435 | A1 | 12/2006 | Vick et al. |
| 2007/0014314 | A1 | 1/2007 | O'Neil |
| 2007/0115827 | A1 | 5/2007 | Boehnke et al. |
| 2007/0136392 | A1 | 6/2007 | Oh et al. |
| 2007/0160047 | A1 | 7/2007 | Park et al. |
| 2007/0263828 | A1 | 11/2007 | Lee et al. |
| 2007/0282990 | A1 | 12/2007 | Kumar et al. |
| 2007/0297356 | A1 | 12/2007 | Rofougaran |
| 2008/0081558 | A1 | 4/2008 | Dunko et al. |
| 2008/0139116 | A1 | 6/2008 | Balgard et al. |
| 2008/0278567 | A1 | 11/2008 | Nakajima |
| 2008/0294937 | A1 | 11/2008 | Ueda |
| 2008/0310611 | A1 | 12/2008 | Moriwaki et al. |
| 2009/0003281 | A1 | 1/2009 | Panabaker |
| 2009/0111378 | A1 | 4/2009 | Sheynman et al. |
| 2009/0116445 | A1 | 5/2009 | Samar et al. |
| 2009/0118018 | A1 | 5/2009 | Perlman et al. |
| 2009/0132362 | A1 | 5/2009 | Fisher et al. |
| 2009/0157799 | A1 | 6/2009 | Sukumaran et al. |
| 2009/0204966 | A1 | 8/2009 | Johnson et al. |
| 2009/0244015 | A1 | 10/2009 | Sengupta et al. |
| 2009/0248875 | A1 | 10/2009 | Kamijima et al. |
| 2010/0031168 | A1 | 2/2010 | Loriedo et al. |
| 2010/0082136 | A1 | 4/2010 | Rosenblatt et al. |
| 2010/0082445 | A1 | 4/2010 | Hodge et al. |
| 2010/0082567 | A1 | 4/2010 | Rosenblatt et al. |
| 2010/0094948 | A1 | 4/2010 | Ganesh et al. |
| 2010/0167809 | A1 | 7/2010 | Perlman et al. |
| 2010/0178868 | A1 | 7/2010 | Charrat |
| 2010/0328225 | A1 | 12/2010 | Black |
| 2010/0332635 | A1 | 12/2010 | Rogel et al. |
| 2011/0047598 | A1 | 2/2011 | Lindley et al. |
| 2011/0065384 | A1 | 3/2011 | Cader et al. |
| 2011/0072501 | A1 | 3/2011 | Fukui |
| 2011/0074703 | A1 | 3/2011 | Black |
| 2011/0078245 | A1 | 3/2011 | Kiffer |
| 2011/0119628 | A1 | 5/2011 | Carter et al. |
| 2011/0148752 | A1 | 6/2011 | Alameh et al. |
| 2011/0183614 | A1 | 7/2011 | Tamura |
| 2011/0205944 | A1 | 8/2011 | Miyabayashi et al. |
| 2011/0210830 | A1 | 9/2011 | Talty et al. |
| 2011/0223937 | A1 | 9/2011 | Leppanen et al. |
| 2011/0276503 | A1* | 11/2011 | Whittington ............. 705/317 |
| 2012/0028578 | A1 | 2/2012 | Tuikka |
| 2012/0079126 | A1 | 3/2012 | Evans et al. |
| 2012/0142433 | A1 | 6/2012 | Perlman et al. |
| 2012/0143944 | A1 | 6/2012 | Reeves et al. |
| 2012/0144233 | A1 | 6/2012 | Griffith et al. |
| 2012/0149476 | A1 | 6/2012 | Perlman et al. |
| 2012/0214413 | A1 | 8/2012 | Rose et al. |
| 2012/0290657 | A1 | 11/2012 | Parks et al. |
| 2012/0290663 | A1 | 11/2012 | Hsieh et al. |
| 2012/0290669 | A1 | 11/2012 | Parks et al. |
| 2012/0329390 | A1 | 12/2012 | Kim |
| 2013/0046976 | A1 | 2/2013 | Rosati et al. |
| 2013/0324169 | A1* | 12/2013 | Kamal et al. ............. 455/466 |
| 2014/0254575 | A1 | 9/2014 | Venkatraman et al. |

FOREIGN PATENT DOCUMENTS

| | | |
|---|---|---|
| EP | 2483771 A1 | 8/2012 |
| EP | 2557764 A1 | 2/2013 |
| WO | 2005076542 A1 | 8/2005 |
| WO | 2005109829 A | 11/2005 |
| WO | 2006111782 A | 10/2006 |
| WO | 2007107982 A | 9/2007 |
| WO | 2010110788 A | 9/2010 |
| WO | 2011139963 A | 11/2011 |

OTHER PUBLICATIONS

Extended EP Search Report dated Aug. 22, 2012 for European Application No. 12167370.1 (8 pages).
Extended European Search Report, EP 12167367.7, Jul. 27, 2012, 8 pgs.
Extended European Search Report, EP 12167369.3, Jul. 27, 2012, 9 pgs.
Final Office Action dated Aug. 10, 2012 for U.S. Appl. No. 13/247,725 (14 pages).
ISR/WO, PCT/US2012/036952, Jul. 30, 2012, 12 pgs.
ISR/WO, PCT/US2012/036957, Jul. 30, 2012, 12 pgs.
Nickelsen, A. et al., "Service migration protocal for NFC links," Proceedings of the 16th EUNICE/IFIP WG 6.6 Conference on Networked Services, Jun. 28-30, 2010, pp. 41-50.
NL Search Report dated Dec. 19, 2012 for Application No. 2008777 (11 pages).
NL Search Report dated Dec. 21, 2012 for Application No. 2008779 (10 pages).
NL Search Report dated Nov. 28, 2012 for Application No. 2008778 (8 pages).
NonFinal Office Action dated Dec. 8, 2011 for U.S. Appl. No. 13/247,725 (10 pages).
NonFinal Office Action dated Sep. 17, 2012 for U.S. Appl. No. 13/461,647 (7 pages).
PCT International Search Report and Written Opinion dated Aug. 22, 2012 for corresponding PCT International Application No. PCT/US2012/036961 (12 pages).
PCT International Search Report and Written Opinion dated Oct. 10, 2013 for PCT International Application No. PCT/US2013/050483 (10 pages).
UK Search Report dated Aug. 13, 2012 for GB Application No. 1208206.1 (5 pages).
UK Search Report dated Aug. 13, 2012 for GB Application No. 1208207.9 (3 pages).
UK Search Report dated Aug. 13, 2012 for GB Application No. 1208205.3 (6 pages).

* cited by examiner

AUTOMATED SHARING OF APPLICATION DATA OVER A NEAR FIELD COMMUNICATION LINK

CROSS-REFERENCE TO RELATED APPLICATIONS

This application claims the benefit of U.S. Provisional Application No. 61/671,965, filed on Jul. 16, 2012. The entire disclosure of the above application is incorporated herein by reference.

FIELD

The present disclosure relates to automated techniques for sharing metadata for applications that do not support data sharing over a near field communication link.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Near field communication (NFC) occurs over short distances. Such data links are established between two devices when the two devices are brought within close proximity to each other, for example, less than 20 centimeters. Once a data link has been established, the two devices can share data over the NFC link.

NFC technology is becoming more prevalent in the marketplace. Many software applications, however, were developed before NFC became widely available and thus do not have methods for sharing data using NFC. Therefore, it is desirable to develop automated techniques for sharing metadata for applications that do not otherwise support data sharing using NFC or other types of short-range wireless connectivity technology.

SUMMARY

A computer-implemented technique is presented. The technique can include establishing, at a first computing device including one or more processors, a near field communication (NFC) link with a second computing device. The technique can include identifying, at the first computing device, an application having a foreground designation in an operating system of the first computing device, the identifying being performed upon establishment of the NFC link with the second computing device. The technique can include determining, at the first computing device, an identifier for the application, wherein the identifier uniquely identifies the application at a source external to the first computing device. The technique can also include transmitting, from the first computing device, the identifier for the application via the NFC link to the second computing device.

In some embodiments, identifying the application having the foreground designation in the operating system of the first computing device includes interacting, at the first computing device, with a task manager associated with the operating system of the first computing device.

In other embodiments, determining the identifier for the application includes interacting, at the first computing device, with a package manager associated with the operating system of the first computing device.

In some embodiments, the identifier for the application includes a package identifier for the application in an online digital media store.

In other embodiments, the identifier for the application includes a uniform resource locator for the source external to the first computing device.

In some embodiments, the technique further includes querying, at the first computing device, the application for data to share with the second computing device, wherein determining the identifier for the application is performed when the application does not support data sharing.

In other embodiments, the technique further includes querying, at the first computing device, the application for data to share with the second computing device, and transmitting, from the first computing device, data shared by the application via the NFC link to the second computing device.

In some embodiments, the technique further includes retrieving, at the first computing device, data to share with the second computing device, wherein the data corresponds to another application residing on the first computing device.

In other embodiments, the technique further includes receiving, at the first computing device, a request for the application via the NFC link from the second computing device, determining, at the first computing device, whether the application can be distributed to the second computing device, and transmitting, from the first computing device, the application via the NFC link to the second computing device, the transmitting of the application being performed in response to the determining that the application can be distributed to the second computing device.

Another computer-implemented technique is also presented. The technique can include establishing, at a first computing device including one or more processors, an NFC link with a second computing device. The technique can include identifying, at the first computing device, an application having a foreground designation at the first computing device by interacting with a task manager residing on the first computing device, the identifying being performed upon establishment of the NFC link with the second computing device. The technique can include querying, at the first computing device, the application for data to share with the second computing device. The technique can include receiving, at the first computing device, data to be shared with the second computing device from the application. The technique can include determining, at the first computing device, an identifier for the application, the determining being performed when the application does not support data sharing and when the identifier uniquely identifies the application at a source external to the first computing device. The technique can also include transmitting, from the first computing device and via the NFC link to the second computing device, at least one the data to be shared and the identifier for the application.

In some embodiments, the identifier for the application includes at least one a package identifier for the application in an online digital media store and a uniform resource locator for the source external to the first computing device.

In other embodiments, the technique further includes retrieving, at the first computing device, data to share with the second computing device, wherein the data corresponds to another application residing on the first computing device.

In some embodiments, the technique further includes receiving, at the first computing device, a request for the application via the NFC link from the second computing device, determining, at the first computing device, whether the application can be distributed to the second computing device, and transmitting, from the first computing device, the application via the NFC link to the second computing device, the transmitting of the application being performed in response to the determining that the application can be distributed to the second computing device.

A first computing device is also presented. The first computing device can include a transceiver and one or more processors. The transceiver can be configured to establish a data link with a second computing device, wherein the data link is established in accordance with an NFC protocol. The one or more processors can be configured to execute an application having a foreground designation by an operating system of the first computing device. The one or more processors can also be configured to upon establishment of the data link with the second computing device, operate to execute an NFC service configured to: (i) identify the application, and (ii) determine an identifier for the application. The transceiver can be further configured to transmit the identifier for the application via the data link to the second computing device, and wherein the identifier uniquely identifies the application at a source external to the first computing device.

In some embodiments, the first computing device further includes a task manager associated with the operating system, wherein the NFC service is further configured to interact with the task manager to identify the application.

In other embodiments, the first computing device further includes a package manager associated with the operating system, wherein the NFC service is further configured to interact with the package manager to determine the identifier for the application.

In some embodiments, the identifier is at least one of a package identifier for the application in an online digital media store and a uniform resource locator for the source external to the first computing device.

In other embodiments, the NFC service is further configured to query the application for data to share, and wherein the transceiver is further configured to transmit the data shared by the application via the data link to the second computing device.

In some embodiments, the NFC service is integrated into the operating system of the first computing device.

In other embodiments, the NFC protocol is defined according to the ISO/IEC 18092 standard.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

The present disclosure will become more fully understood from the detailed description and the accompanying drawings, wherein.

DETAILED DESCRIPTION

Figure 1:
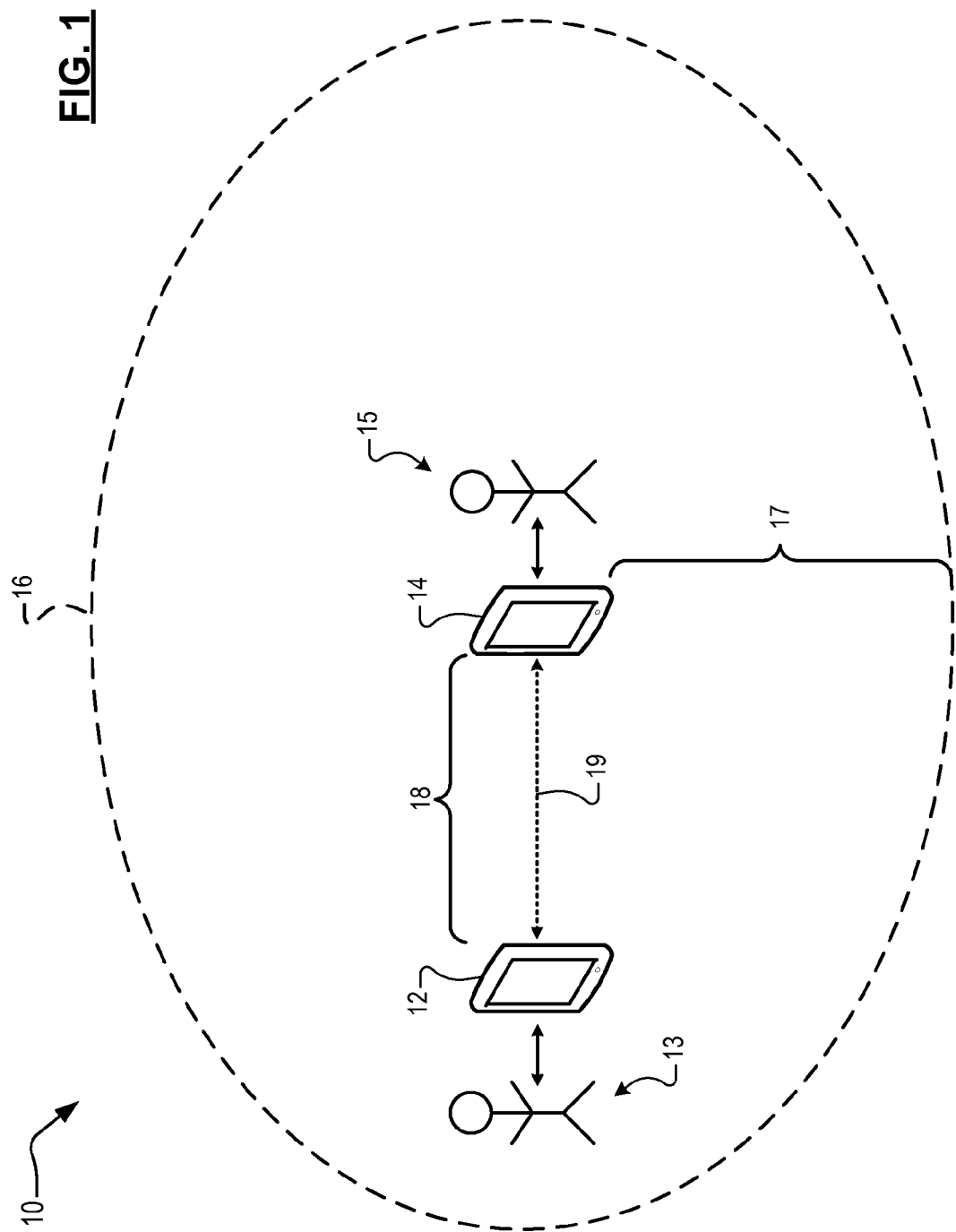
FIG. 1 is a diagram depicting an example of a near field communication (NFC) system including a first mobile computing device according to some implementations of the present disclosure.

FIG. 1 depicts a near field communication (NFC) system 10. NFC is a short-range wireless technology that operates over short distances, for example, less than 20 centimeters. In one embodiment, NFC is established in accordance with communication protocols defined in the ISO/IEC 18092 standard as set forth by the International Standard Organization. While specific reference is made to NFC, it is understood that the concepts described herein may be extendable to other types of short-range wireless connectivity technology.

The NFC system 10 generally includes a first mobile computing device 12 and a second mobile computing device 14, which can be operated and transported by a first user 13 and a second user 15, respectively. The first mobile computing device 12 and the second mobile computing device 14 can be any suitable mobile computing device including one or more processors (a laptop computer, a tablet computer, a mobile phone, etc.). It should be appreciated that while two mobile computing devices 12, 14 are shown, one of the mobile computing devices may be a non-portable or stationary computing device, e.g., a desktop computer. One of the two mobile computing devices 12, 14, however, is typically a mobile computing device because one mobile computing device is brought into range for NFC with the other mobile computing device.

In order to establish NFC between the first mobile computing device 12 and the second mobile computing device 14, the first mobile computing device 12 (the "initiator") initiates communication with the second mobile computing device 14 (the "target"). To do so, the first mobile computing device 12 may generate an electromagnetic field 16 using radio frequency (RF) waves. For example, the RF waves may have a frequency of approximately 13.56 megahertz (MHz) within a bandwidth of approximately 14 kilohertz (kHz), although it should be appreciated that other frequency ranges are contemplated by this disclosure. The electromagnetic field 16 extends outwardly from the first mobile computing device 12 as indicated. Successful NFC transmission can occur within an area defined by a first distance 17 which may be, for example, approximately 20 centimeters. Since NFC transmissions at this first distance 17 may be inconsistent and therefore may suffer from data loss, more effective NFC transmissions may occur within a shorter distance 18 which may be, for example, approximately 4 centimeters.

An NFC data link can be established between the first mobile computing device 12 and the second mobile computing device 14 when the first mobile computing device 12 and the second mobile computing device 14 are brought within close proximity to each other. Communication between the first mobile computing device 12 and the second mobile computing device 14 may follow one of two modes of operation: passive mode and active mode. In passive mode, only one mobile computing device generates a radio field, while the other mobile computing device uses load modulation to transfer data. In this mode, the initiator device is responsible for generating the radio field. In active mode, both mobile computing devices 12, 14 generate their own radio field to transmit data. Thus, in either mode, a data link 19 is established between the two mobile computing devices 12, 14, as shown in FIG. 1.

Figure 2:
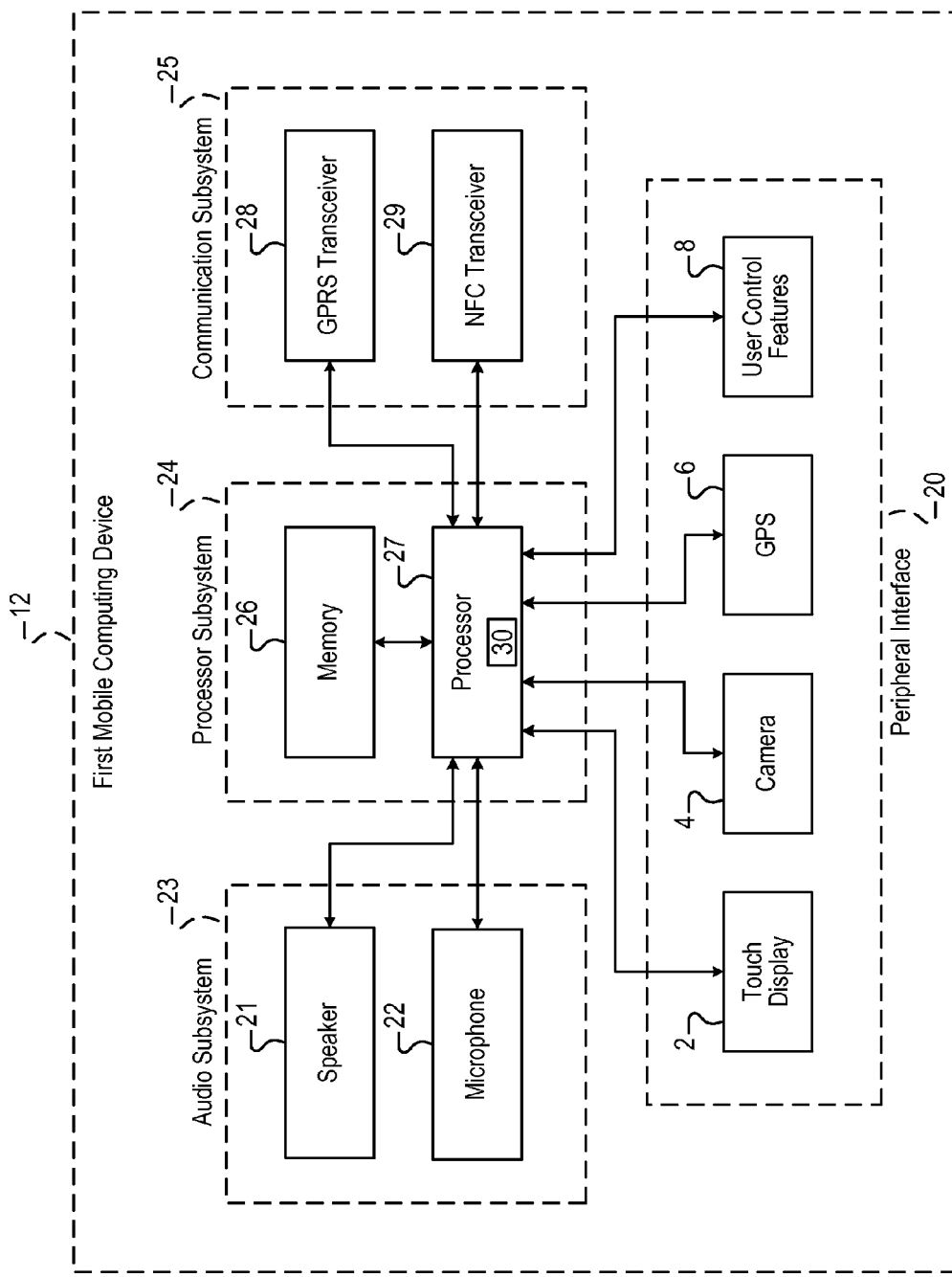
FIG. 2 is a functional block diagram depicting an example of the first mobile computing device of FIG. 1 including a processor according to some implementations of the present disclosure.

FIG. 2 depicts an example functional block diagram of the first mobile computing device 12. It should be appreciated that the same or similar architecture can also be implemented in the second mobile computing device 14. The first mobile computing device 12 can include: an audio subsystem 23, a processor subsystem 24 and a communication subsystem 25. Components comprising each of these subsystems are further described below. While context is provide with reference to a mobile phone, it is readily understood that the techniques described herein may be implemented in other types of NFC-configured mobile computing devices (a laptop computer, a tablet computer, etc.).

The audio subsystem 23 is comprised of a microphone 22 for capturing audio input from the device operator and a speaker 21 for outputting audio data to the first user 13. Such audio components are readily known in the art. The communication subsystem 25 includes one or more wireless transceivers or connectivity interfaces. A general packet radio service (GPRS) transceiver 28, hereinafter referred to as cellular transceiver 28, is one exemplary type of wireless interface. NFC transceiver 29 is another exemplary type of wireless interface. Protocols for establishing an NFC link between devices are handled by the NFC transceiver 29. Chips comprising integrated circuits for implementing the NFC transceiver 29 are commercially available. Other types of wireless interfaces may include but are not limited to satellite, Bluetooth, and other cellular interfaces.

During operation, speech input captured by the microphone 22 is converted to suitable data form by the processor subsystem 24 before being passed along to the communication subsystem 25 for transmission. Likewise, incoming signals received by the communication subsystem 25 are passed along for processing to the processor subsystem 24. Overall operation and control of the first mobile computing device 12 are also carried out by the processor subsystem 24, including the techniques for sharing application data over an NFC link as further described below. The processor subsystem 24 can include a processor 27, a memory 26, and other electronic circuitry. It should be appreciated that the term "processor" as used herein can also refer to two or more processors operating in a parallel or distributed architecture. The processor 27 can include components, e.g., instructions, which, when executed by the processor 27, cause the processor 27 to perform functions according to the present disclosure. These components or instructions are illustrated in FIG. 3 and described in detail below.

The processor subsystem 24 may also be interfaced with other peripheral components of a peripheral interface. Example components include a touch display 2, a camera 4, a global positioning system (GPS) device 6, as well as user control features 8, such as on/off buttons or volume controls. It is to be understood that components relevant to this discourse are discussed above, but that other known components, e.g., a battery, are needed to control and manage the overall operation of the first mobile computing device 12. Within the broader aspects of the disclosure, it is also envisioned that these components may be arranged in other varying configurations.

Figure 3:
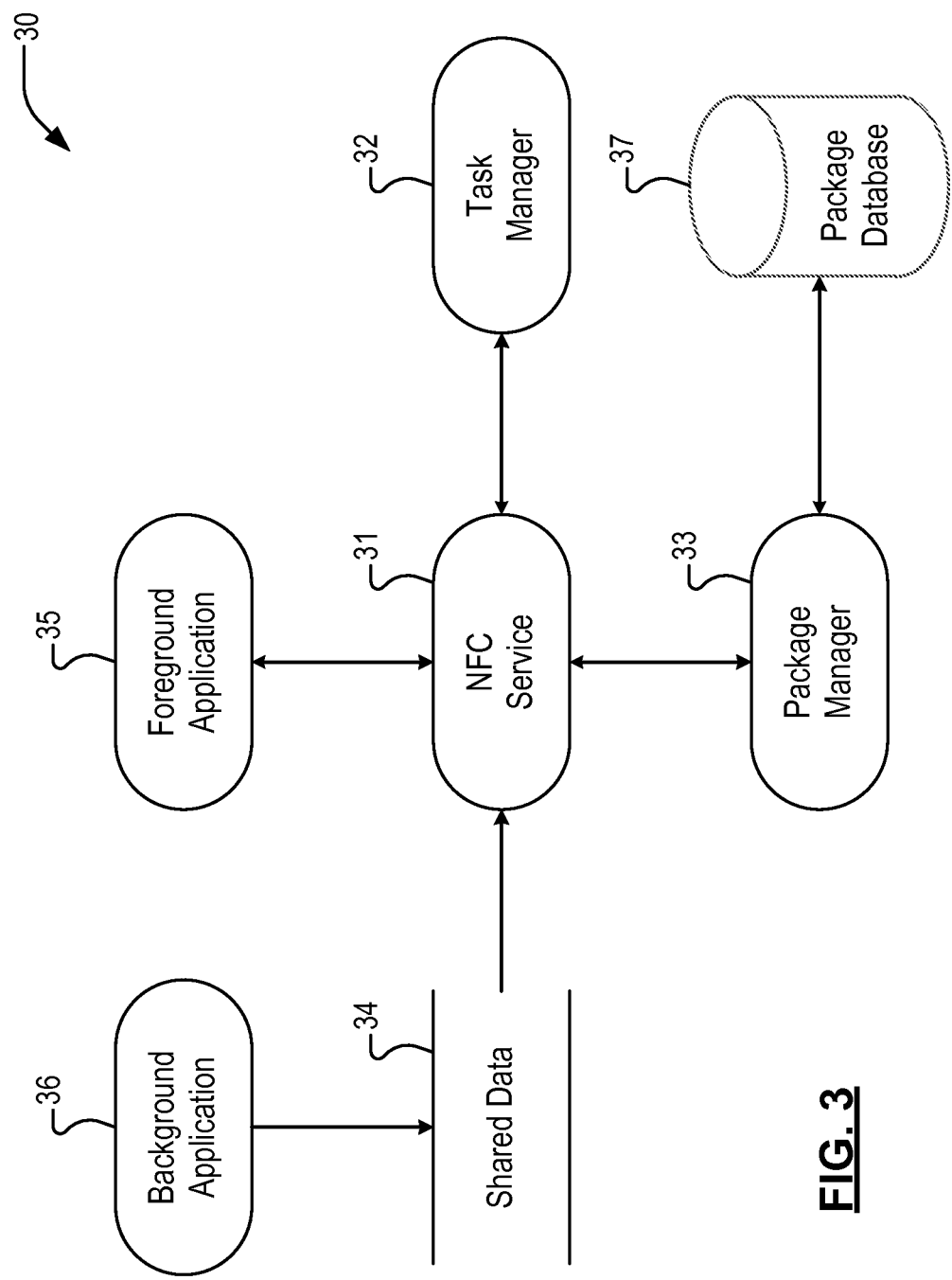
FIG. 3 is a diagram depicting example components of the processor of FIG. 2.

FIG. 3 illustrates an example of the components 30 used to execute data sharing techniques in an NFC-enabled device, such as the first mobile computing device 12. The components 30 may include an NFC service 31, a task manager 32, and a package manager 33. As previously mentioned, in an exemplary embodiment, these components 30 are implemented as computer executable instructions executed by the processor 27 of the first mobile computing device 12. It should be appreciated, however, that each of the components can be implemented as one or more modules in the first mobile computing device 12. Each of the components is further described below.

The NFC service 31 functions as an interface with the NFC transceiver 29. When the first mobile computing device 12 comes within range of another NFC-enable computing device, e.g., the second mobile computing device 14, the NFC transceiver 29 operates to establish an NFC data link between the devices, e.g., data link 19. Once established, the NFC transceiver 29 sends a notification message of the NFC data link to the NFC service 31. The NFC service 31 in turn initiates one or more methods for sharing data via the NFC data link. One example technique for sharing metadata for applications that do not support NFC data sharing is further described below. Other methods for sharing data may also be implemented by the NFC service 31.

The task manager 32 is a program that provides information about the processes and programs running on the first mobile computing device 12. For example, the task manager 32 may identify an application as having a foreground or background designation. In a multiprocessing system, the foreground application 35 is typically designated as the application currently receiving input from a device user; whereas, a background application 36 is a process executed by the processor 27 without visibility to the first user 13. The task manager 32 or some comparable service is typically provided by the operating system of the first mobile computing device 12.

The package manager 33 is a collection of software programs that automate the process of installing, upgrading, configuring and removing software programs on the first mobile computing device 12. The package manager 33 maintains a database 37 of metadata for each software program residing on the first mobile computing device 12. Of note, the package manager 33 may maintain an identifier that uniquely identifies the application at an external data source, such as a package identifier at an online digital media store. The package manager 33 may be queried by another program to obtain metadata for a given program. The package manager 33 or some comparable service is typically provided by the operating system of the first mobile computing device 12.

In an exemplary embodiment, the components 30 described above are implemented by an operating system of the first mobile computing device 12. It is readily understood that some or all of these components 30 may be implemented outside of the operating system. It is also envisioned that the operating system may implement other functions and features not described herein.

Figure 4:
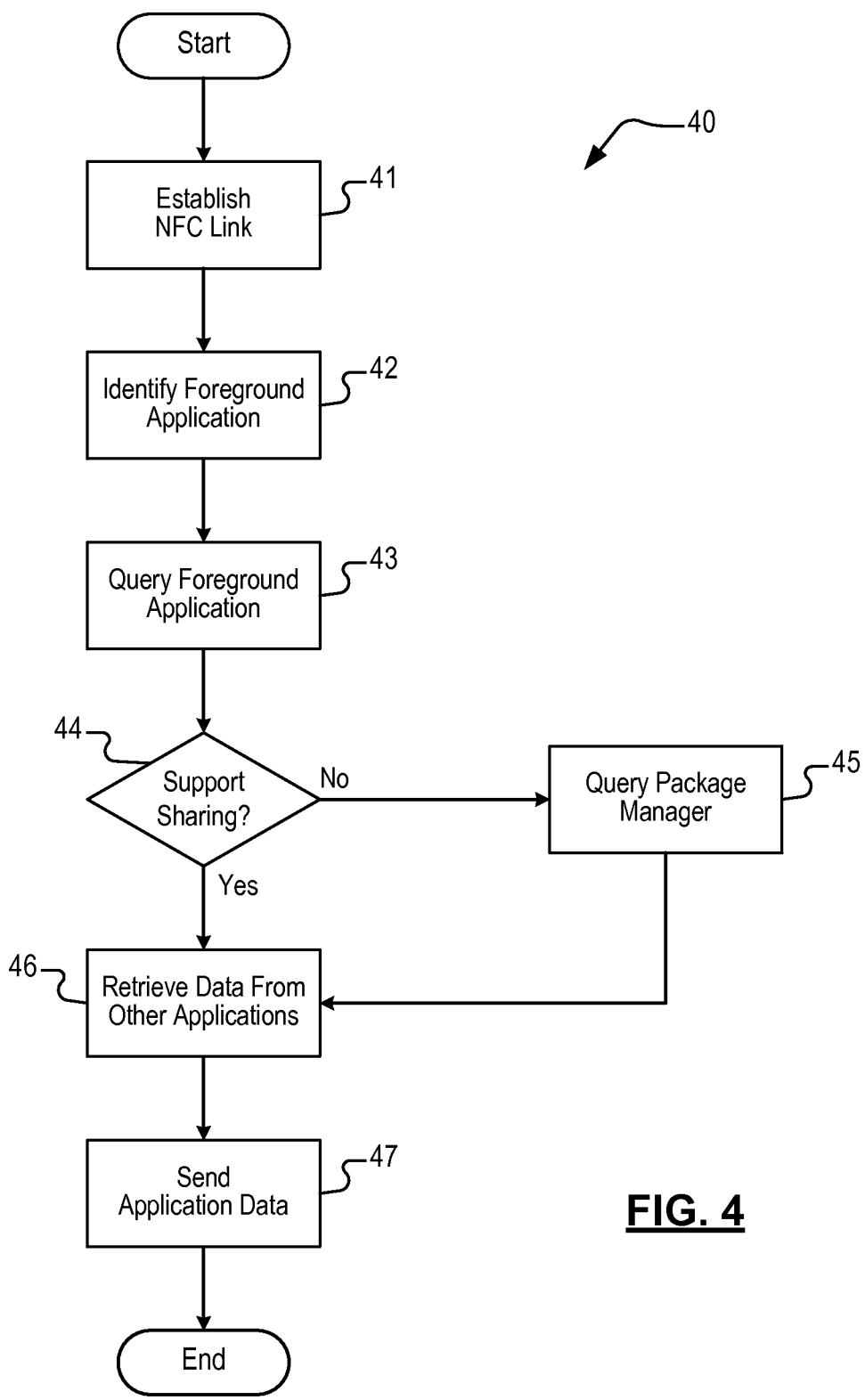
FIG. 4 is a flowchart illustrating an example technique for sharing content over an NFC link established between the first mobile computing device and another NFC-enabled computing device according to some implementations of the present disclosure.

FIG. 4 illustrates an example technique 40 for sharing data between the first mobile computing device 12 and another NFC-enabled computing device, e.g., the second mobile computing device 14. An NFC data link is established at 41 when the first mobile computing device 12 comes within range of the other NFC-enabled computing device. It is readily understood that the technique may be also implemented and executed concurrently by the second mobile computing device 14.

Upon receiving notification of an NFC link from the NFC transceiver, the NFC service 31 identifies at 42 the application having a foreground designation by an operating system of the first mobile computing device 12. In an exemplary embodiment, the NFC service 31 queries the task manager 32 to determine the foreground application. In response, the task manager 32 provides an identifier for the foreground application 35 to the NFC service 31. Other techniques for identifying the foreground application are contemplated by this disclosure.

Given an identifier for the foreground application 35, the NFC service 31 can query the application at 43 for any data it desires to share via the NFC link. In some instances, the foreground application 35 has been configured to share data via the NFC link. In these instances, the foreground application 35 can respond to the query with any data to be shared to the NFC service. If the NFC service 31 determines that the foreground application 35 does support data sharing at 44, the NFC service 31 can (i) optionally, retrieve data from other applications as indicated at 46, and (ii) send the data via the NFC link to the receiving device as indicated at 47. In other instances, the foreground application 35 may not be configured to share data via the NFC link. In these instances, the NFC service 31 is further configured to share metadata for applications that do not support data sharing in the manner set forth below.

When the foreground application 35 does not support data sharing, the NFC service 31 can determine additional metadata for the foreground application. More specifically, the NFC service 31 may determine an identifier that uniquely identifies the application at a data source external to the device. In an exemplary embodiment, the NFC service 31 queries the package manager 33 to determine additional metadata for the foreground application at 45. In response, the package manager 33 provides an identifier that uniquely identifies the application at an external data source. In one example, the metadata is further defined as a package identifier for the application in an online digital media store. In another example, the metadata is further defined as a uniform resource locator (URL) for a website from which the application can be retrieved. Metadata for the foreground application 35 may further include an application name, application version number, etc. The technique 40 can then proceed to 46.

In addition to sharing data pertaining to the foreground application, the NFC service 31 may optionally share data from non-foreground or background applications residing on the device as indicated at 46. Different techniques may be used to learn of data to be shared. In one example embodiment, applications that are configured to share data will log data to be shared in a data store 34. The NFC service 31 can then retrieve the data to be shared from the data store 34. In another example embodiment, the NFC service 31 registers with the operating system to receive data to be shared. Applications configured to share data can then send data to be shared directly to the NFC service 31 upon learning of the registered request from the operating system. In either case, the NFC service 31 can subsequently send the data to be shared via the NFC link to the other NFC-enabled computing device as indicated at 47.

Lastly, the NFC service 31 interfaces with the NFC transceiver 29 to send any data to be shared to the other NFC-enabled computing device. Data to be shared can be integrated into the NFC Data Exchange Format ("NDEF data format") or any other suitable format. The technique 40 can then end or return to 41 for one or more additional cycles. It is to be understood that only the relevant steps of the sharing technique are discussed in relation to FIG. 4, but that other software-implemented instructions may be needed to control and manage the overall operation of the NFC service 31 on the first mobile computing device 12.

Figure 5:
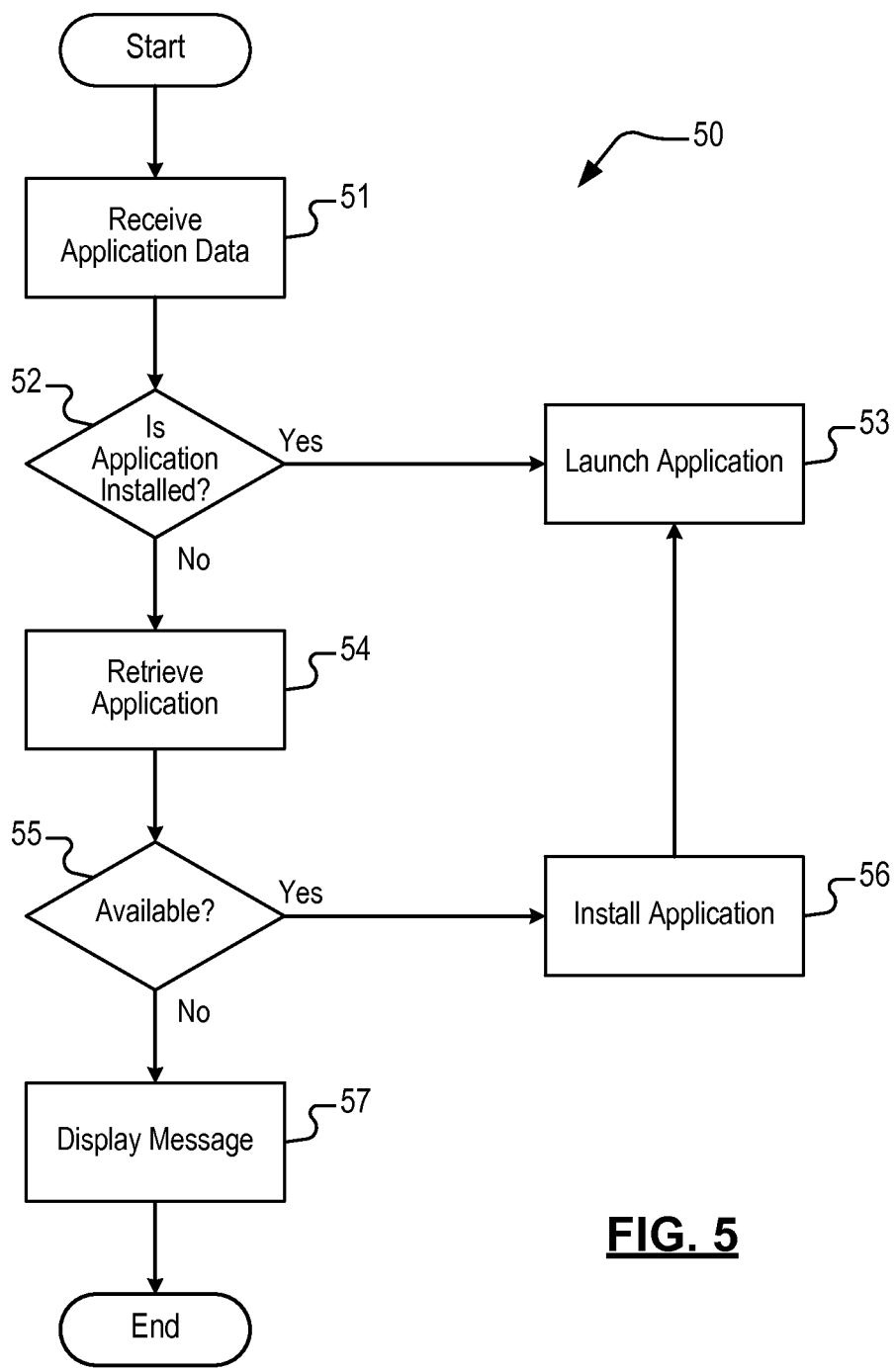
FIG. 5 is a flowchart illustrating an example technique for handling shared data at the other NFC-enabled computing device according to some implementations of the present disclosure.

FIG. 5 illustrates an example technique 50 for handling shared data at the other NFC-enabled computing device, e.g., the second mobile computing device 14, hereinafter "the receiving device." Given an established NFC link, data sent by the first mobile computing device 12 is received at 51 by the NFC service 31 of the receiving device. Upon receipt, the shared data is parsed by the NFC service 31 of the receiving device.

For a given application, a determination is first made at 52 as to whether the application associated with the shared data is installed on the receiving device. In an exemplary embodiment, the NFC service 31 queries the package manager 33 to determine whether the application is installed. The query can be performed using an identifier sent by the first mobile computing device 12. When the application is installed on the receiving device, the NFC service 31 proceeds to launch the application as indicated at 53. In some instances, the application is launched with data shared by the first mobile computing device 12. For example, a map application may be launched with an address being viewed by the map application on the first mobile computing device 12. In other instances, the application is not configured to share data and thus the application is launched without any shared data.

When the application is not installed or otherwise available on the receiving device, the NFC service 31 can attempt to retrieve the application as indicated at 54. As noted above, the first mobile computing device 12 is configured to share metadata even for applications that do not support data sharing. More specifically, an identifier that uniquely identifies the application at an external data source is shared with the receiving device. The NFC service 31 at the receiving device can in turn try to retrieve the application using the identifier. For example, a package identifier for the application may be used to retrieve the application from an online digital media store.

When the application is determined to be available at the external source and successfully retrieved by the receiving device at 55, the retrieved application can be installed at 56 by the receiving device. In an exemplary embodiment, the NFC service 31 interacts with the package manager 33 to install the retrieved application on the receiving device, although other techniques for installing the application are contemplated by this disclosure. In this way, an application that does not support data sharing has been seamlessly shared via an NFC link with the receiving device. The technique 50 can then proceed to 53.

Conversely, if the application was unavailable from the external source at 55, a user of the receiving device, e.g., the second user 15 of the second mobile computing device 14, is notified at 57. In an example embodiment, a message may be displayed on a display of the receiving device. The message may indicate the name of the application being shared as well as an indication of where the application may be obtained, for example, the name of an online digital media store. Other forms of notification are contemplated by this disclosure. The technique 50 can then end or return to 51 for one or more additional cycles. It is to be understood that only the relevant steps of handling the shared data are discussed in relation to FIG. 5, but that other software-implemented instructions may be needed to control and manage the overall operation of the NFC service 31 on the receiving device.

Figure 6:
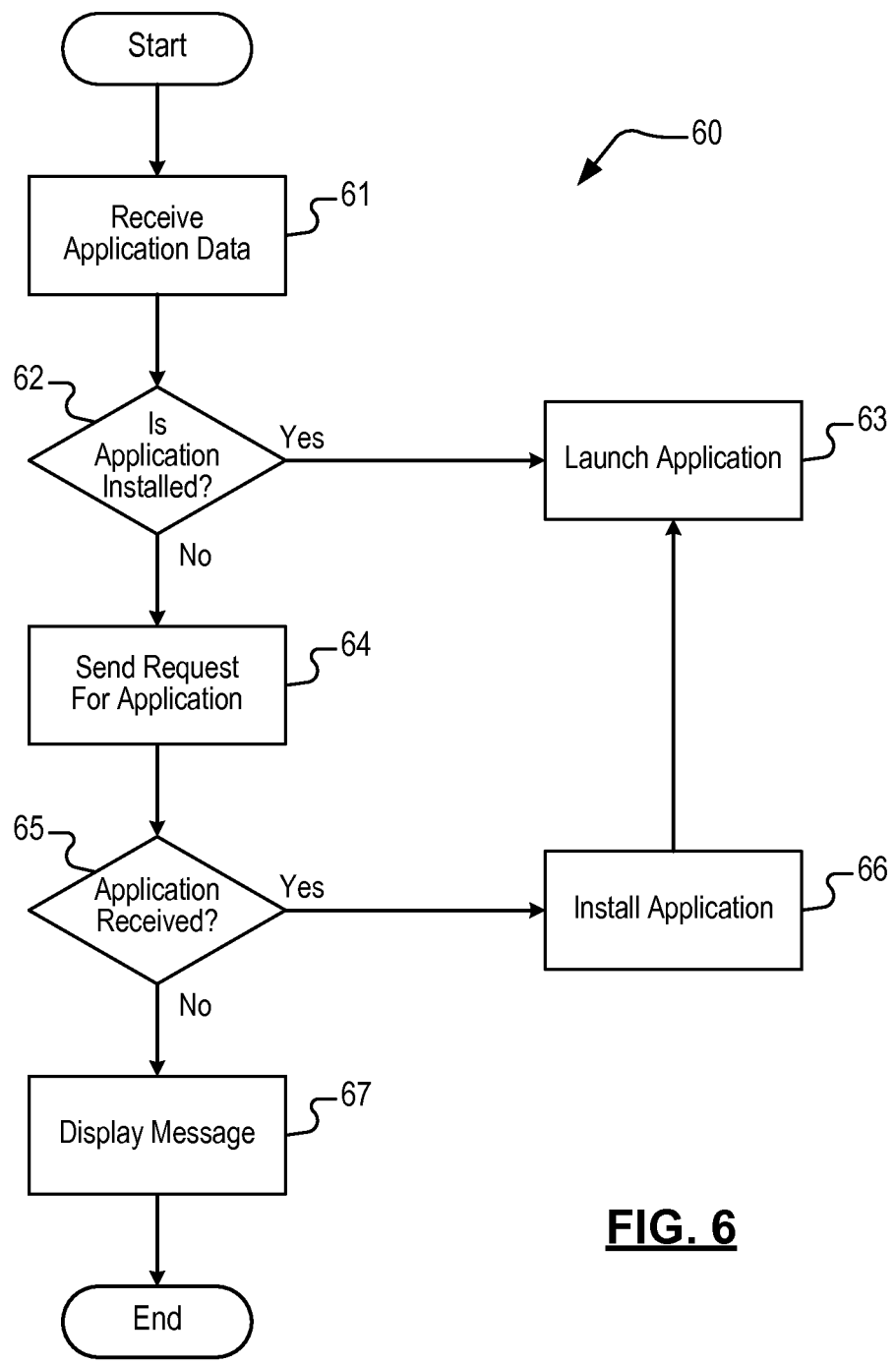
FIG. 6 is a flowchart illustrating another example technique for handling shared data at the other NFC-enabled computing device according to some implementations of the present disclosure.

FIG. 6 illustrates an alternative technique 60 for handling shared data at the receiving device. Given an established NFC link, shared data is received and parsed at 61 by the NFC service 31 of the receiving device. In a similar manner as set forth above, a determination is then made at 62 as to whether the application is installed on the receiving device. When the application is installed on the receiving device, the NFC service 31 proceeds at 63 to launch the application.

In an alternative approach, the receiving device may try retrieving the application associated with the shared data from the first mobile computing device 12. To do so, a request for the application is sent from the receiving device at 64 via the NFC link to the first mobile computing device 12 when the application is not installed or otherwise available on the receiving device. Upon receiving the request, the NFC service 31 at the sending device will process the request. In particular, the NFC service 31 will make a determination as to whether the application can be shared or otherwise distributed to other computing devices. In an exemplary embodiment, applications acquired from an online digital media store may include an indicator for whether the application can be shared. For instance, applications downloaded without a charge from the online digital media store may be eligible for distribution to the receiving device.

Applications that can be shared can then be sent from the first mobile computing device 12 to the receiving device. In one embodiment, the NFC service 31 sends the requested application via the NFC link to the receiving device at 64. In another embodiment, the NFC service 31 may interface with another type of transport mechanism, such as a Bluetooth, WiFi, or WiFi Direct interface, to send the requested application to the receiving device. In some instances, the alternate transport mechanism provides a faster data link. In either case, upon receiving the requested application at 65, the application can be installed at 66 and then launched at 63 by the receiving device.

Lastly, the user of the receiving device may be notified at 67 when the requested application was unavailable from the first mobile computing device 12 at 65. It is also envisioned that the alternative techniques for handling shared data may be combined. That is, the receiving device may try retrieving the application from an external source first before trying to retrieve the application from the first mobile computing device 12 or vice-versa. The technique 60 can then end or return to 61 for one or more additional cycles. It is to be understood that only the relevant steps of handling the shared data are discussed in relation to FIG. 6, but that other software-implemented instructions may be needed to control and manage the overall operation of the NFC service on the receiving device.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    establishing, at a first computing device including one or more processors, a near field communication (NFC) link with a second computing device;
    identifying, at the first computing device, an application having a foreground designation in an operating system of the first computing device, the identifying being performed upon establishment of the NFC link with the second computing device;
    querying, at the first computing device, the application for data to share with the second computing device;
    determining, at the first computing device, an identifier for the application when the application does not support data sharing, wherein the identifier uniquely identifies the application at a source external to the first computing device; and
    transmitting, from the first computing device, the identifier for the application via the NFC link to the second computing device.

2. The computer-implemented method of claim 1, wherein identifying the application having the foreground designation in the operating system of the first computing device includes interacting, at the first computing device, with a task manager associated with the operating system of the first computing device.

3. The computer-implemented method of claim 1, wherein determining the identifier for the application includes interacting, at the first computing device, with a package manager associated with the operating system of the first computing device.

4. The computer-implemented method of claim 1 wherein the identifier for the application includes a package identifier for the application in an online digital media store.

5. The computer-implemented method of claim 1 wherein the identifier for the application includes a uniform resource locator for the source external to the first computing device.

6. The computer-implemented method of claim 1, further comprising:
    transmitting, from the first computing device, data shared by the application via the NFC link to the second computing device.

7. The computer-implemented method of claim 1, further comprising retrieving, at the first computing device, data to share with the second computing device, wherein the data corresponds to another application residing on the first computing device.

8. The computer-implemented method of claim 1, further comprising:
    receiving, at the first computing device, a request for the application via the NFC link from the second computing device;
    determining, at the first computing device, whether the application can be distributed to the second computing device; and
    transmitting, from the first computing device, the application via the NFC link to the second computing device, the transmitting of the application being performed in response to the determining that the application can be distributed to the second computing device.

9. A computer-implemented method, comprising:
    establishing, at a first computing device including one or more processors, a near field communication (NFC) link with a second computing device;
    identifying, at the first computing device, an application having a foreground designation at the first computing device by interacting with a task manager residing on the first computing device, the identifying being performed upon establishment of the NFC link with the second computing device;
    querying, at the first computing device, the application for data to share with the second computing device;

receiving, at the first computing device, data to be shared with the second computing device from the application;

determining, at the first computing device, an identifier for the application, the determining being performed when the application does not support data sharing and when the identifier uniquely identifies the application at a source external to the first computing device; and transmitting, from the first computing device and via the NFC link to the second computing device, at least one of the data to be shared and the identifier for the application.

10. The computer-implemented method of claim 9, wherein the identifier for the application includes at least one of a package identifier for the application in an online digital media store and a uniform resource locator for the source external to the first computing device.

11. The computer-implemented method of claim 9, further comprising retrieving, at the first computing device, data to share with the second computing device, wherein the data corresponds to another application residing on the first computing device.

12. The computer-implemented method of claim 9, further comprising:

receiving, at the first computing device, a request for the application via the NFC link from the second computing device;

determining, at the first computing device, whether the application can be distributed to the second computing device; and transmitting, from the first computing device, the application via the NFC link to the second computing device, the transmitting of the application being performed in response to the determining that the application can be distributed to the second computing device.

13. A first computing device, comprising:

a transceiver configured to establish a data link with a second computing device, wherein the data link is established in accordance with a near field communication (NFC) protocol; and one or more processors configured to:

execute an application having a foreground designation by an operating system of the first computing device; and upon establishment of the data link with the second computing device, operate to execute an NFC service configured to:

(i) identify the application, (ii) query the application for data to share with the second computing device, and (ii) determine an identifier for the application when the application does not support data sharing, wherein the transceiver is further configured to transmit the identifier for the application via the data link to the second computing device, and wherein the identifier uniquely identifies the application at a source external to the first computing device.

14. The first computing device of claim 13, further comprising a task manager associated with the operating system, wherein the NFC service is further configured to interact with the task manager to identify the application.

15. The first computing device of claim 13, further comprising a package manager associated with the operating system, wherein the NFC service is further configured to interact with the package manager to determine the identifier for the application.

16. The first computing device of claim 13, wherein the identifier is at least one of a package identifier for the application in an online digital media store and a uniform resource locator for the source external to the first computing device.

17. The first computing device of claim 13, wherein the transceiver is further configured to transmit the data shared by the application via the data link to the second computing device.

18. The first computing device of claim 13, wherein the NFC service is integrated into the operating system of the first computing device.

19. The first computing device of claim 13, wherein the NFC protocol is defined according to the ISO/IEC 18092 standard.

20. The first computing device of claim 13, wherein the NFC service is further configured to retrieve data to share with the second computing device, wherein the data corresponds to another application residing on the first computing device.

* * * * *